US007648303B2

(12) United States Patent
Zorzo

(10) Patent No.: US 7,648,303 B2
(45) Date of Patent: Jan. 19, 2010

(54) DEVICE FOR LOCKING THE ARTICULATED JOINT IN THE LONGITUDINAL DIRECTION BETWEEN THE PLATE OF A DUST MOP AND THE HANDLE

(76) Inventor: Renato Zorzo, Via Ronca No. 17, Onara (PD) (IT) 35010

( * ) Notice: Subject to any disclaimer, the term of this patent is extended or adjusted under 35 U.S.C. 154(b) by 0 days.

(21) Appl. No.: 11/962,188

(22) Filed: Dec. 21, 2007

(65) Prior Publication Data

US 2008/0152423 A1 Jun. 26, 2008

(30) Foreign Application Priority Data

Dec. 22, 2006 (IT) .......................... PD2006A0467

(51) Int. Cl.
*F16C 11/00* (2006.01)

(52) U.S. Cl. .......................................... 403/93; 403/94

(58) Field of Classification Search .................. 403/93, 403/94
See application file for complete search history.

(56) References Cited

FOREIGN PATENT DOCUMENTS

| | | | |
|---|---|---|---|
| EP | 430069 A1 * | 6/1991 |
| EP | 430846 A1 * | 6/1991 |

* cited by examiner

*Primary Examiner*—Victor MacArthur
(74) *Attorney, Agent, or Firm*—QuickPatents, Inc.; Kevin Prince

(57) ABSTRACT

Device for locking the articulated joint in the longitudinal direction between the plate of a dust mop and the handle, which permits deactivation and subsequent reactivation of the locking of the articulated joint between the handle and the plate in a longitudinal direction, carried out by the user with his feet instead of his hands.

7 Claims, 5 Drawing Sheets

DEVICE FOR LOCKING THE ARTICULATED JOINT IN THE LONGITUDINAL DIRECTION BETWEEN THE PLATE OF A DUST MOP AND THE HANDLE

CROSS-REFERENCES

None.

FIELD OF THE INVENTION

The subject matter of this patent is a device for locking the articulated joint in the longitudinal direction between the plate of a dust mop and the handle.

BACKGROUND OF THE INVENTION

As is well-know the plates for dust mops are connected to their relative handle with the usual attachments that allow the handle to be articulated with respect to the plane of the plate both in the transversal as well as in the longitudinal direction.

Sometimes, for some cleaning operations, it is necessary to make it solid and prevent any swinging between the plate and the handle in the longitudinal direction of the plane of the handle, by locking the relative articulated joint.

On the market the devices that carry this out are extremely complex and therefore costly.

For the deactivation and subsequent activation operation, for said devices on the market you have to use your hands, something that is extremely inconvenient for the user.

The purpose of this patent is to make a simple, and therefore cheap, device which permits deactivation and subsequent reactivation of the locking of the articulated joint between the handle and the plate in a longitudinal direction, carried out by the user with his feet instead of his hands.

The base element, with an open female type connection on the bridge-shaped pivot with an elliptical section and joined to the plate, which creates the articulated joint in the transversal direction with respect to plane of the plate, has above the hinge zone, in order to carry out the articulated joint in the longitudinal direction of the plate, an extension configured as a female with central hollow.

The handle-holder element fitted with threading for the flange (not drawn), in addition to the lower hinge zone for coupling with the base element for creating the articulated movement in the longitudinal direction of the plate, has a fork configuration for the entire zone above up to where the chamber for inserting the handle ends.

The arms of the fork, for the section relative to the extension above the hinge zone, have some raised areas on the internal walls functioning as a guide for a sled element to be inserted inside.

On the four lower walls of the arms there are two arrays of conchoidal imprints joined to the planes of the above-mentioned walls, and which are used by the sled element for coupling the raised areas with which it is equipped, for remaining in a stopped position during the execution of two different operating actions (locking and unlocking).

The sled element, whose section is configured in a complementary way to the transversal section of the stroke of the fork along which it has to travel going up and going down, has a male appendage on its lower surface whose size corresponds to the female hollow on the upper extension of the base element into which it has to go to lock the articulated joint.

Said sled element has two sturdy cantilever extensions in the centre of the sides, in the form of arms, to be maneuvered with the foot of the operator who uses the dust mop for cleaning, fitted with device of which the sled element is a part.

What has been described is clarified in the enclosed drawings.

DESCRIPTION OF THE PREFERRED EMBODIMENT

Figure 1:
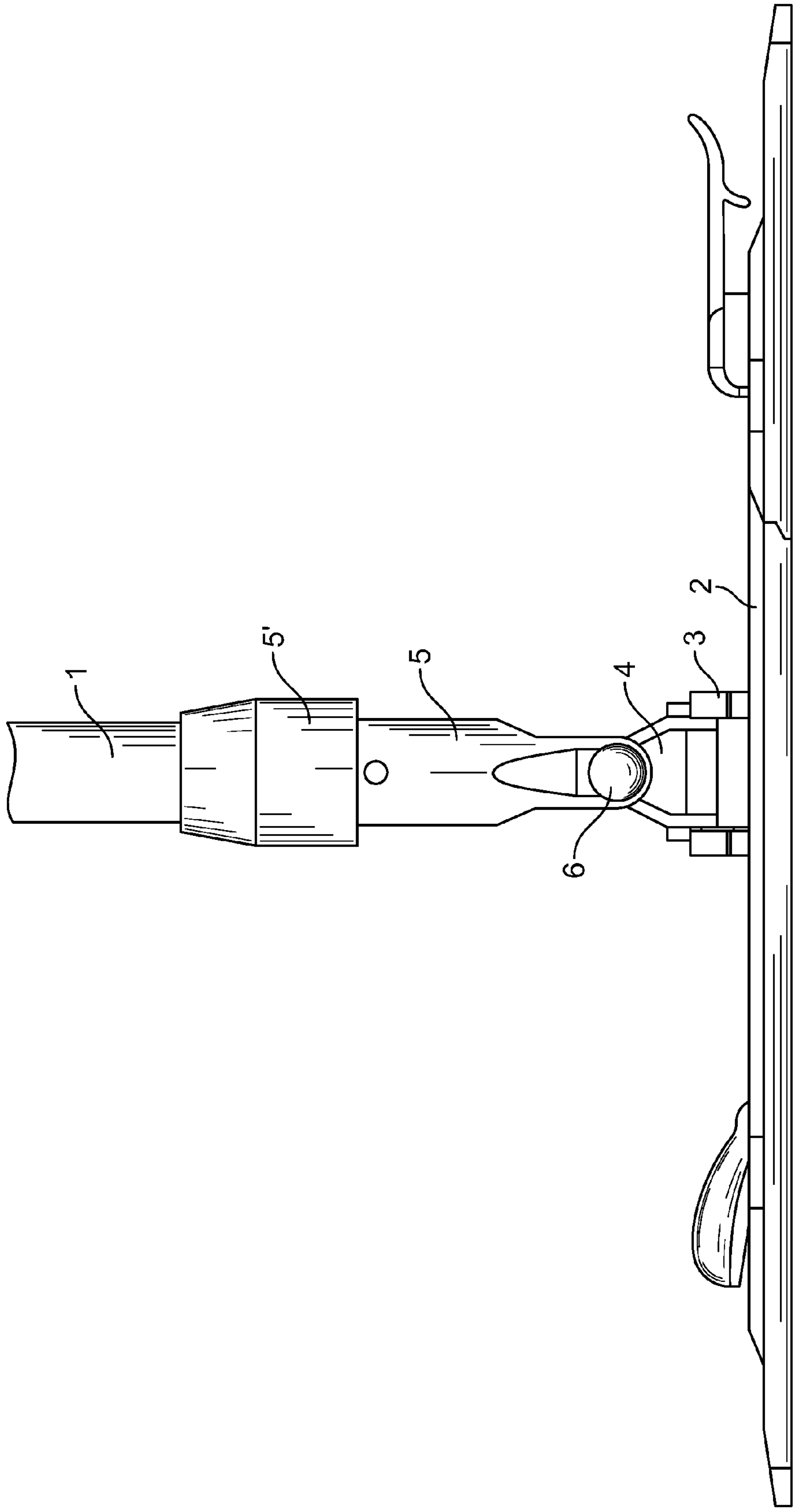
FIG. 1 (Prior Art)
FIG. 1 is a common type of mop plate fitted with a base element with the lower female part that, when coupled by means of hinging with the bridge-shaped crosspiece joined to the upper surface of the plate, allows the articulated joint to move in the direction transversal to the surface of the plate; it is fitted with a handle-holding element, which when hinged with its female lower end to the upper male element of the base, provides articulated movement in the longitudinal direction with respect to the plane of the plate.
Figure 2:
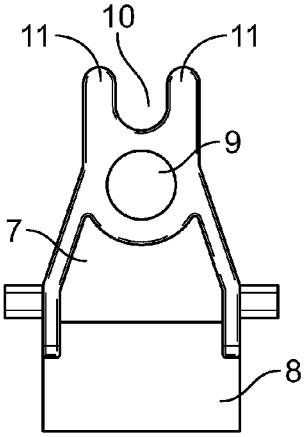
FIG. 2 shows a front view of the base element with the lower part for the articulated connection with the plate for a cleaning mop and with the central part for the articulated connection with the handle-carrying element and with the upper part composed of an extension configured like a fork, whose hollow has the function of acting as a female connection.
Figure 3:
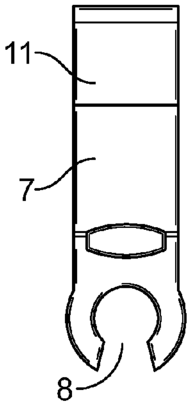
FIG. 3 shows the element of FIG. 2 seen from the side.
Figure 4:
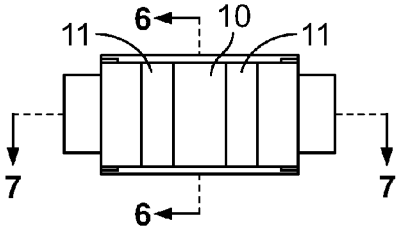
FIG. 4 shows the element of FIG. 2 seen from above.
Figure 5:
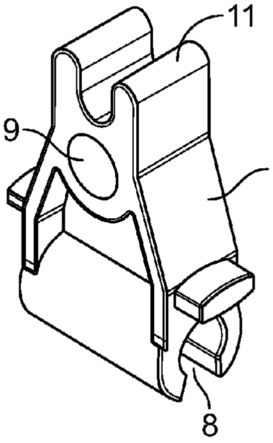
FIG. 5 is the axonometric view of the element of FIG. 2.
Figure 6:
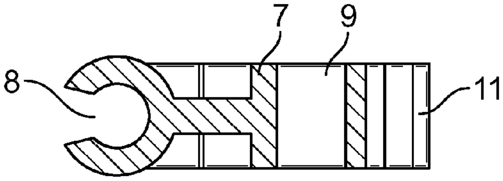
FIG. 6 is the midpoint section relative to FIG. 2 according to the height.
Figure 7:
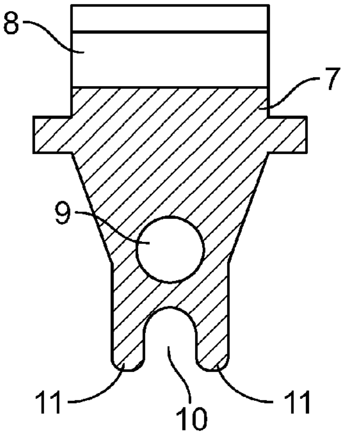
FIG. 7 is the midpoint section relative to FIG. 2 according to the width.
Figure 8:
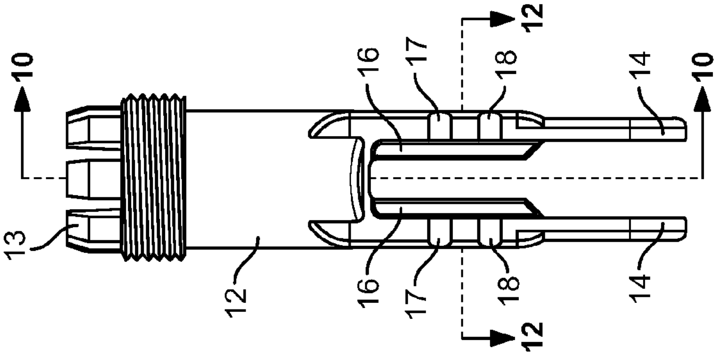
FIG. 8 shows the handle-carrying element seen from the front, evidencing the fork-shaped part whose arms in the end tract are fitted with housings for the hinge pin for the articulation with the base element and in the remaining adjacent tract the internal walls have raised areas and on the side surfaces there are two arrays of conchoidal imprints; the raised areas making up the guides for the up and down course of a sled element that is installed joined to the inside of the fork and making up the two arrays of conchoidal imprints, the housings in which special protrusions engage on the wing-like extensions, with which the sled is equipped for being positioned in a stop position to the end of the upper course and to the end of the lower course.
Figure 9:
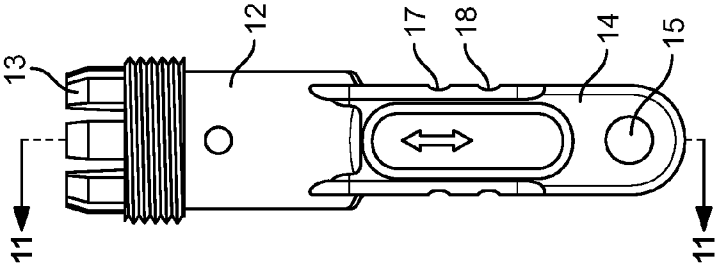
FIG. 9 is the side view of the element represented in FIG. 8.
Figure 10:
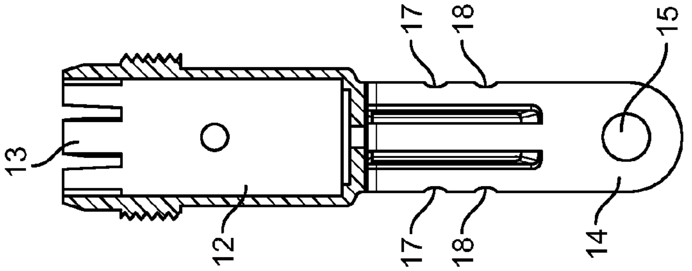
FIG. 10 shows the longitudinal section of the element represented in FIG. 8 according to the midpoint plane passing into the chamber between the two arms of the fork.
Figure 11:
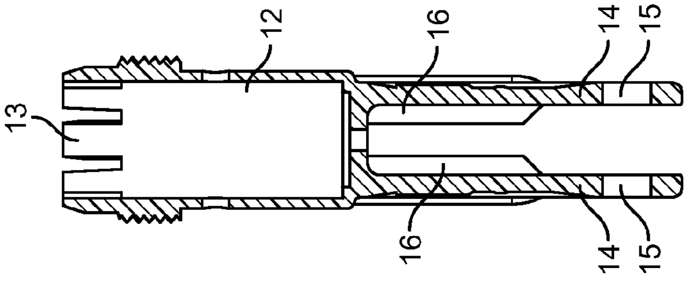
FIG. 11 shows the longitudinal section of the element represented in FIG. 8 according to the midpoint plane rotated 90 degrees with respect to the plane of the section relative to FIG. 10.
Figure 12:
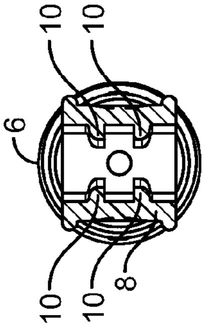
FIG. 12 shows the transversal section of the element represented in FIG. 8 according to a passing plane in line with the tract marked by the two orders of conchoidal imprints on the side surfaces of the arms of the fork.
Figure 13:
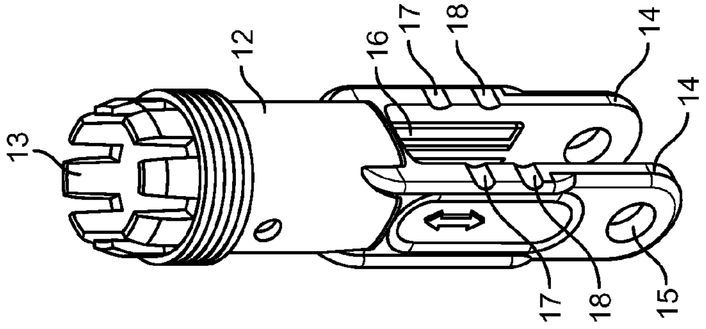
FIG. 13 is the axonometric view taken from above of the element represented in FIG. 7.
Figure 14:
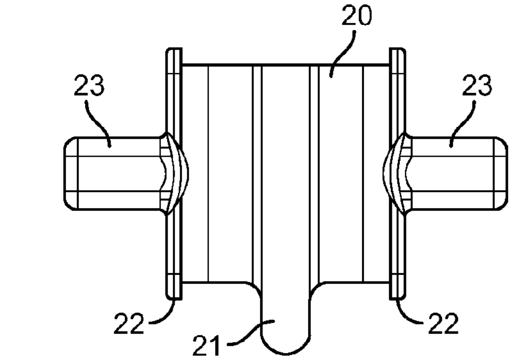
FIG. 14 shows the sliding element seen from the front which is mounted inside the fork of the element represented in FIG. 7. We can see the raised part below the central zone dimensionally configured to engage as a male connector into the concavity of the fork in the upper part of the base element represented in FIG. 2. We can see the two wing expansions on the sides, fitted centrally with protrusions and we can see the two cantilever extensions with a horizontal disposition that come out in the middle area of the sides for activating the above-mentioned sled up and down, using the cleaning operator's feet.
Figure 15:
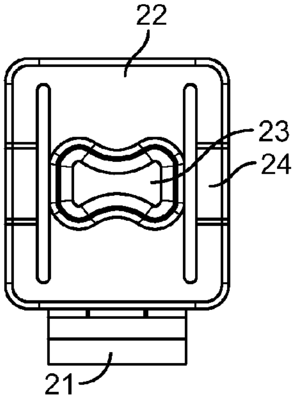
FIG. 15 is the side view of the element represented in FIG. 14.
Figure 16:
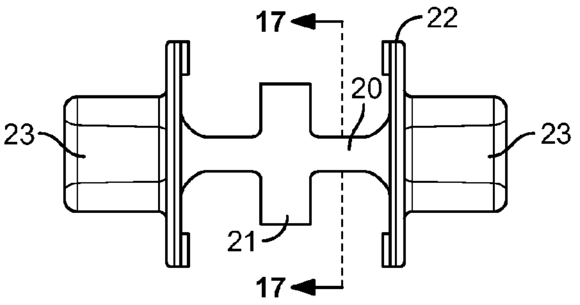
FIG. 16 is the view from above of the element represented in FIG. 14.
Figure 17:
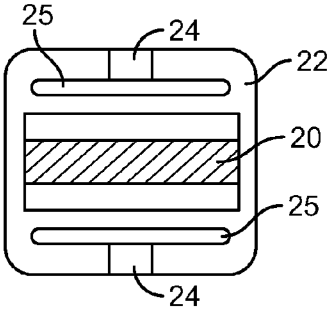
FIG. 17 is the section of the element of FIG. 14 according to a vertical plane passing through D-D.
Figure 18:
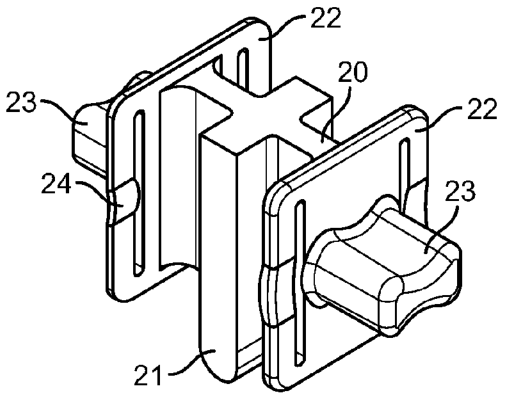
FIG. 18 is the axonometric view of the sled element represented in FIG. 14.
Figures 19, 20, 21, 22, 23:
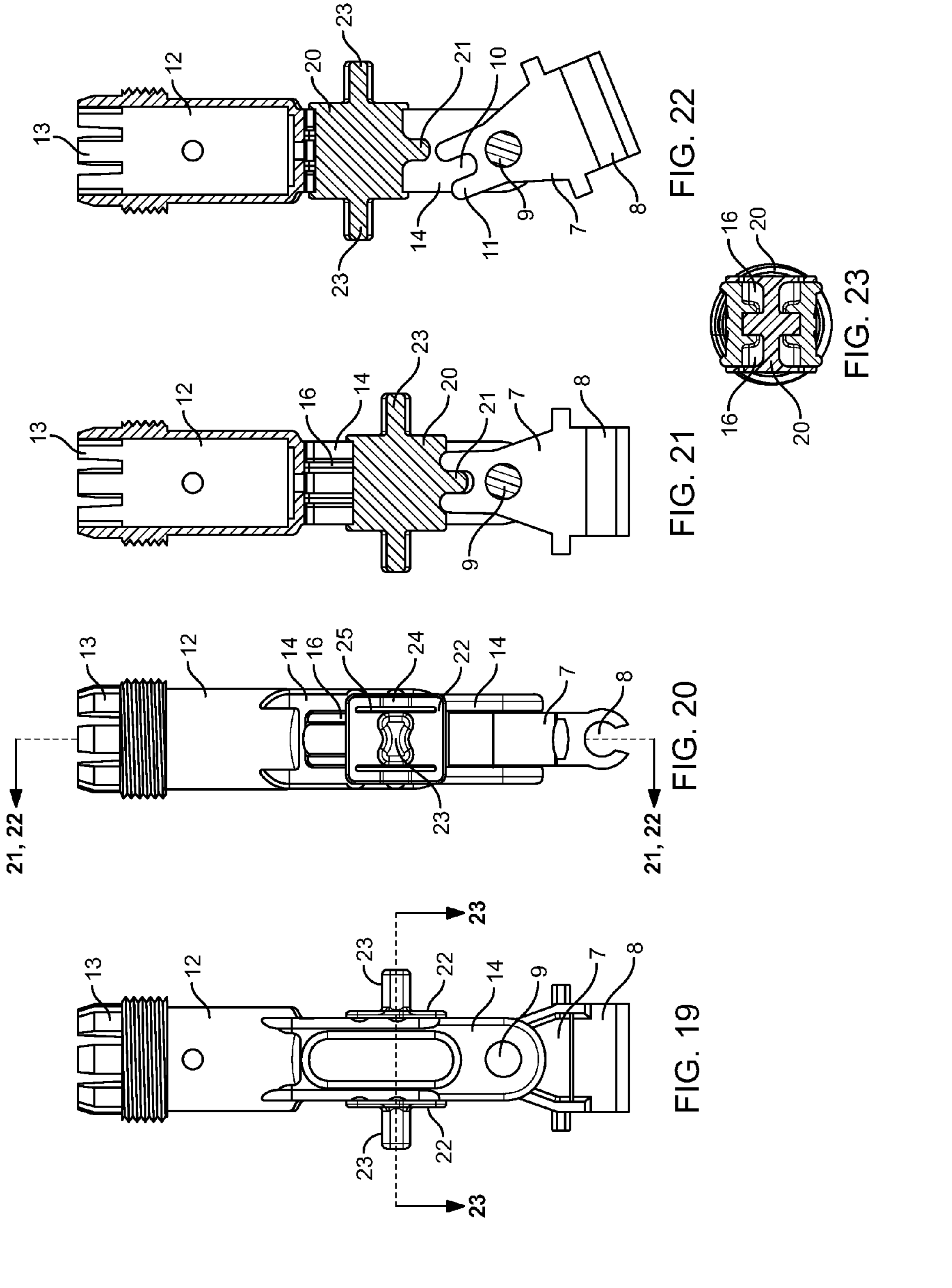
FIG. 19 is the outer frontal view of the three elements united with each other, each configured to create the device that is the object of the patent and precisely the base element with the lower part of attaching to the dusting mop plate making the transversal articulation, with the central part for the articulated connection with the handle-holder element and with the upper part composed of a fork-shaped extension, whose cavity has the function of a female connector and with the upper fork-shaped female part with a central female cavity. The handle-holding element with the fork-shaped configuration with guides on the inner surface of the arms and with conchoidal imprints on the side walls of the arms, coupled with the attachment element to the plate, realising with this latter the longitudinal articulation between the handle and the plate; the sled element inserted into the fork of the handle-holder element. According to what can be seen in the diagram, the sled element that is an engaged position with its protrusions in the conchoidal imprints on the sides of the arms of the fork, creates the locking of the longitudinal articulation between the plate and the handle.
FIG. 20 is the side view relative to FIG. 19.
FIG. 21 shows the longitudinal section of the three elements joined together to make the articulation shown in FIG. 20. We can see, as said above, that the sled element, positioned with its protrusions in the conchoidal imprints on the sides of the arms of the fork of the handle-holding element, finds itself coupled with its male element in the female hollow of the base element, thereby locking the articulation in the longitudinal direction between the handle and the plate.
FIG. 22 shows a longitudinal section corresponding to FIG. 21 of the three elements joined together, where the sliding element is positioned in the upper course with its protrusions engaged in the upper conchoidal imprints on the surfaces on the side of the fork, and its male element is sufficiently distant from the summit of the female configuration of the base element with the attachment to the base, so as to allow a possible articulation in the longitudinal direction between the handle and the plate.
FIG. 23 is a cross-sectional view of the invention, taken generally along lines 23--23 of FIG. 19.

The functioning of the device with reference to the attached diagrams occurs as described.

In the usual cleaning brushes with support plate 2, the articulation in the transversal direction in reference to the support plate, between said support plate and the handle 1, takes place through the hinged coupling between the lower part of the prior art base element 4 with the bridge-shaped crosspiece united with the upper surface of the support plate 2; while the articulated joint, in the longitudinal direction with reference to the plane of the support plate, between said support plate 2 and the handle, takes place through hinging 6 of the lower part of the handle-holder 5 with the upper part of the prior art base element 4.

The handle 1 is bonded to the handle-holding element 5 by means of a clamping ring nut 5'.

To lock the longitudinal joint between handle 1 and support plate 2, according to the device of the patent, one proceeds as indicated below.

You couple, by hinging, the lower part 8 of the base element 7 to the bridge-shaped crosspiece 3, defining a pivot, joined to the support plate 2 and you make the articulation that is transversal to the plane of the plate.

You insert into the intervening space of the arms 14 of the fork of the handle element 12 the sled element 20 with the male shaped appendage 21 facing the entrance of the fork until it couples with the guides 16 on the internal sides of the arms 14. The wings 22 of the sled element 20 are juxtaposed to the side walls of the arms 14 of the fork while a means for reversible moving, said means, for example, complementary protrusions 24, with which they are fitted, during the sliding of the sled element 20, couple with a means for registering, said means, for example, conchoidal imprints 17, 18 on the side walls of the arms 14 of the fork.

To allow the complementary protrusions 24 of the wings 22 to resiliently lift up when they are not in line with the conchoidal imprints 17, 18, said wings 22 are separated from the body of the sled element 20 by a means for resiliently sliding, said means, for example, slits 25 in their central extension.

The movement up and down of the sled element 20 is carried out by acting on the cantilever extensions 23 with which the sled element is fitted.

You insert the upper portion 11 of the base element 7 into the fork 14 until the holes 15 are aligned with the hole 9 of the base element. The articulation in the longitudinal direction with respect to the plane of the support plate 2 is realised by applying the hinge pin, which has not been drawn.

To realise the locking of the above-mentioned joint, the handle-holding element 12 is positioned so that the hollow 10 of the base element 7 is in a central position with respect to the arms 14 of its fork.

It is slid down, the sled element 20 acting on the cantilever extensions 23 so that its male appendage 21 engages the hollow 10 of the base element 7 and its complementary protrusions 24 of the wings 22, freeing themselves from the conchoidal imprints 17, engage with the lower conchoidal imprints 18 of the above-mentioned arms.

To release the operations are carried out in the reverse order to the locking.

In the explanatory drawings relative to the diagrams successive to FIG. 1, neither the clamping ring nut 5' of the handle 1, nor the handle has been drawn; while we can see the elastic tightening appendages 13 and the thread for screwing the ring nut element 12.

Remember that the manoeuvre for locking and unlocking the articulated joint in the longitudinal direction of the sweeper plate, with support plate 2 fitted with the device of this patent, is carried out by using the foot (or shoe) on the cantilever extension 23 of the sled element 20.

What has been just described is by way of example, so variations, and improvements, to the device carried out by an expert in the field do not detract from the invention when the instruction so of the above-mentioned patent are used.

I claim as my invention:

1. An articulating joint for a dust mop, comprising:

a handle element for attachment to a dust mop handle, the handle element having a fork extending therefrom, the fork having two substantially parallel arms and an intervening space, the two arms having facing surfaces and each arm having two side surfaces, the two arms further having first and second coaxial holes therethrough defining a first horizontal axis of rotation orthogonal to the facing surfaces thereof;

a base element for attachment to a mop support plate having a pivot, the attachment at the pivot, the pivot defining a second horizontal axis of rotation, the second horizontal axis of rotation orthogonal to the first horizontal axis of rotation, the base element having an upper portion with a hollow therein and a third hole therethrough, the upper portion pivotally joined to the arms with a hinge pin connecting the first, second and third holes, whereby the hollow is substantially positioned within the intervening space;

a sled element slidably disposed in the intervening space with a male appendage engageable to the hollow, the sled element having a first position wherein the male appendage and the hollow are interpositionally locked and the handle element joined thereby fixedly with the base element is free to articulate only about the second horizontal axis of rotation and a second position wherein the male appendage and the hollow are unlocked and the handle element joined thereby rotatably with the base element is free to articulate about both the first and second horizontal axes of rotation; and a means for reversibly moving the sled element from the first position to the second position by manipulating with a user's foot, as opposed to hand.

2. The articulating joint of claim 1, wherein the means for reversibly moving is a cantilever extension protruding from a side of the sled element betwixt the arms of the handle element sufficiently for engagement by the user's foot for the purpose of manipulation thereto.

3. The articulating joint of claim 2, further comprising a second cantilever extension protruding from an opposite side of the sled element thereby providing for engagement bilaterally.

4. The articulating joint of claim 1, further comprising a means for registering the first and second positions, thereby preventing inadvertent dislodgement of the sled element.

5. The articulating joint of claim 4, wherein the means for registering is at least one pair of conchoidal imprints on at least one side surface of at least one arm of the handle element and at least one complementary protrusion on a wing of the sled element overlapping the at least one side surface, the at least one complementary protrusion provided with a means for resiliently sliding from one imprint of the pair to the other.

6. The articulating joint of claim 5, wherein the means for resiliently sliding is a slit in the wing inboard of the at least one protrusion extending bilaterally therefrom to provide a flexible beam support thereto, whereby the at least one protrusion may be reversibly urged out of engagement in one imprint of the pair and slid into engagement to the other.

7. The articulating joint of claim 6, wherein multiple sets of conchoidal imprint pairs, complementary protrusions, wings and slits is four, the four sets arrayed proximate to the four side surfaces of the two arms of the fork to define therewith a translational direction of the sled element relative to the handle element, the translational direction oriented toward the base element where an engagement of the male appendage to the hollow can be achieved with locating registration.

* * * * *